United States Patent Office 3,311,477
Patented Mar. 28, 1967

3,311,477
METHOD OF PREPARING FREE-FLOWING
WATER-INSOLUBLE SOLID PARTICLES
Sidney Segal, 1301 N. Harrison St.,
Wilmington, Del. 19806
No Drawing. Filed Mar. 9, 1965, Ser. No. 438,410
12 Claims. (Cl. 99—113)

The present invention is a continuation-in-part of my copending application Ser. No. 250,027, filed Sept. 20, 1963, in turn a continuation-in-part of Ser. No. 94,109, filed Feb. 17, 1961, now Patent No. 3,221,338, in turn a continuation-in-part of Ser. No. 56,380, filed Feb. 21, 1960, now abandoned.

My invention relates to the art of preparing free-flowing water-insoluble solid particles, anti-setting and anti-caking.

According to the present invention solvent insoluble solids including mixtures of solvent insoluble solids admixed with solvent soluble solids in particle form ranging from dusts up through large granules, fragments, crumbs or curds, either of organic or inorganic materials, tend to set or cake in storage whereby they resist easy flow, that is, resist being poured from containers. Moreover, in a related property such solids sometimes coalesce or cohere into lumps when attempts are made to disperse them in liquids, whereby excessive working or agitation of the liquid over substantial periods of time is necessary before such lumps or particles can be homogeneously dispersed in the liquid. This problem is often more acute with the more finely divided solids. According to this invention, the insoluble solids composition is moistened with a miscible mixture of liquids one component of which is water and the other is a volatile organic liquid miscible with water.

The term "insoluble solids" as it is used herein includes solids in which all or a large portion of a mixture of different solids are insoluble in a liquid with which it is wet in the processing thereof to convert them to free flowing form. Moreover, as the term "insoluble solids" is used herein, it refers to the specific solid in relation to the particular treatment thereof to render it free flowing. It is not material that the insoluble solids hereof might incidentally be soluble in solvents remote from the instant treating liquids, or soluble in strong reaction solvents like acids or alkalis also remote from the instant treating solution.

The water miscible volatile organic solvent component of the treating liquid mixture may be any easily volatilized water-soluble organic liquid in which the solid to be treated is insoluble and which is otherwise inert to the solid being treated. The treating liquid is removed from the solids, by evaporation in air often with moderate heat. For this reason a liquid is selected which may be evaporated at a practical temperature at which the solids are stable; that is, a temperature within which the solids do not melt or decompose. Hence, depending on the material to be treated, organic liquids variable in a substantial range of volatilities may be selected. The liquids of lower volatility, of course, can be removed from the solids more rapidly, easily and with best heat economy. With such considerations the organic liquid will usually have a boiling point below about 250° C. The lower temperature of the boiling point range also is not critical. It is usually selected as a composite with the water with which it is used as a treating liquid. For instance, a solution comprising a substantial quantity of water may have a quite volatile organic liquid mixed therewith, so that the solution per se would be substantially stable at ambient temperatures, that is at about 30° C. It is preferred, of course, to use an organic liquid which per se has a boiling point above about 30° C. Suitable water miscible volatile organic solvents are the lower ketones such as acetone, methylethyl ketone, diacetyl; the lower alcohols such as methanol, ethanol, isopropanol; lower aliphatic acids such as formic, propionic or acetic; lower aldehydes such as formaldehyde, acetaldehyde and the like.

The quantity of water in the liquid mixture in broadest aspect is in the range of 2 to 85%. For treatment of food products I prefer 25 to 85% water, and for treatment of non-food products, the preferred range is 2 to 60% water.

In practice the insoluble solids to be treated are usually merely moistened with a few percent sufficient to homogeneously wet their surfaces mixing to effect the even distribution of the liquids over the solids surfaces. Where a large quantity of liquid has been used in the wetting of the solids, for instance sufficient to suspend or filter the liquid through the solids mass, the excess liquid is filtered off or decanted. The wetted solids are then dried, sometimes by heating, and usually in a stream of warm dry air or other gas inert to the solids being treated, often with agitation, although the stream of air per se may be used to agitate the solids as by fluidizing the mass of solid by blowing warm air therethrough. The temperature of drying or of the warmed air need not be more than sufficient to evaporate the moistening liquid over a moderate period of heating or aerating, such as from 5 to 10 minutes up to several hours for thorough drying. The drying oven or the air can be heated up to, or slightly in excess of, the boiling point of the wetting solution, whereby the drying rate is increased. It is also possible to dry the solids without the aid of gases; that is, merely by applying heat to the wetted mass of solids, preferably coupled with agitation, heating the same to slightly exceed the boiling point of the wetting liquid. The treatment, in addition to reducing the tendency of the solids to cake or resist dispersement in liquids, usually tends to cohere very fine dusts into somewhat larger particles which have increased resistance to clumping and caking.

The solids treated by this invention can be resolved into two types. The first are solids which almost invariably are used alone as such in their normal insoluble state and consequently are treated alone; or, if they are admixed with other components, they are usually in a mixture of solids all of which are insoluble components and, consequently, the quantity of liquid with which they are wet is not critical and the amounts used is limited only by the aspect of economy in subsequent drying to remove the liquid. Such solids of the first type may be identified as clays, such as bentonite, kaolin, porous silicas such as diatomaceous earth, fuller's earth, finely divided metal oxides, ores or mineral concentrates such as iron oxide, zinc oxide, tin oxide, alumina, non-porous silica, lead oxide, titanium dioxide, and other mineral pigments, ground mineral dusts, wood flour, solvent insoluble organic plastics such as Bakelite, epoxy resins, ground glass, coal dust, graphite, carbon black, coke dust, talc, pumice, powdered vermiculite, barium sulfate, powdered metals and other typical commercially available insoluble solids having the characteristics described.

The second class of solvent insoluble solids are those which are usually used commercially in a blend or mixture with other solids which may be solvent soluble, that is, soluble in one of the liquid components of the instant liquid treating mixture. Such mixed soluble and insoluble solids components are of various types, generally organic, which in their mixed form are an improved commercially acceptable or desirable form. Where the insoluble solid is to be used commercially in conjunction with the soluble solids, the insoluble solids can of course be first processed to render them free flowing just as insoluble solids of the first class are treated according to this invention, and then, after being rendered free flowing by the procedure hereof, can be blended with soluble solids. Such soluble solids can also have been independently treated to render them free flowing as described in my copending application, Ser. No. 94,109 filed Feb. 17, 1961, now Patent No. 3,221,338. Preferably the preformed mixture of insoluble and soluble solids are treated in the same manner as the insoluble solids would be treated alone, except that the solvent for the soluble solids component is applied in quantity insufficient to dissolve a substantial proportion of the soluble solids.

Thus, for example, if it were desired to render dried milk, malted or whole, dried powered egg albumin, whole egg white or yolks, free flowing and readily dispersible according to this invention, it could be treated with a liquid such as a mixture of water and acetone. The egg solids are soluble in niether of these liquids. After homogeneously wetting followed by drying to remove the wetting liquids, the egg solids become free flowing. On the other hand, the dried egg may be mixed with soluble components, for example flours, starches, cereals or sugar as is typical in dried cake, pancake or soft drink mixes. Such mixture of soluble solids and insoluble solids can be treated also with the same water and acetone as its wetting liquid. In this case, however, where the solvent soluble solids component is present, less than sufficient water must be used in the total wetting liquid applied to avoid dissolving any substantial quantity of the water soluble solids components.

An important advantage of treatment of very finely divided solids according to this invention with the mixed liquids hereof is that the particles tend to coalesce from extremely fine dusts into somewhat larger granules and it is in their larger granulated character that they exhibit good free-flowing, non-clumping, easily dispersible characteristics. In the instance of the totally insoluble solids, the treatment may comprise modifications of the ionic or surface characteristics of the particles. In the case of solids containing some soluble components, the treatment may result in a softening or slight tackifying of the soluble components by forming a soluble surface film thereover which aids in the cohesion of soluble and insoluble particles, and may even result in a coating of insoluble with soluble components. Whatever the result, and the invention is not to be limited by the specific theory explaining the result which takes place, the fine particles tend to coalesce into larger ones in the conversion to free-flowing solids.

This method, however, can be modified to apply an extraneous coating to the solids by dissolving a film-forming substance in the treating liquid so that after treating the solids to render them free flowing and removing the volatile liquids in the subsequent drying and evaporation, a thin film may be deposited upon the particles. Thus, the method hereof is flexible to modify the characteristics of the insoluble solids to render them free flowing, to enlarge the fine particles into larger granules, to coat them with soluble components with which they may be admixed, or to coat them with an added film-forming substance dissolved in the treating liquid. The coating material may be any, depending on the ultimate use of the solid. In the case of mixed soluble and insoluble solids it is sometimes useful to select a coating material which is the same as the soluble material.

The following examples illustrate the practice of this invention.

*Example 1*

30 pounds of cement were treated with 2000 cc. of a 50% solution of isopropanol in water by means of a Patterson-Kelley liquid solids blender. When this entire system was thoroughly blended in said machine, it was then dried and the product produced was free flowing, anti-clumping and easily dispersed in water.

*Example 2*

6 pounds of pancake mix flour containing 15% of insoluble dried milk solids were treated with 600 cc. of a 50% solution of ethanol in water by means of a Patterson-Kelley liquid solids blender. When this entire system was thoroughly blended in said machine, it was then dried and the product produced was free flowing, anti-clumping and easily dispersed in water.

*Example 3*

A system was prepared containing 500 gms. of powdered freshly ground cement, 250 cc. of acetone, and 50 cc. of water. The liquids were combined first and the cement added. The liquid was poured off and the cement was air dried with heat. The resulting cement was readily dispersible in water.

*Example 4*

A system was prepared comprising 250 gms. of pancake mix, containing 10% of dried milk solids and 5% of dried whole egg, the balance being flour, a small quantity of leavening, and seasoning agents, 2000 cc. of acetone and 50 cc. of water. The liquids were combined first, and the pancake mix added with agitation. The liquid was removed and the powder was air dried with heat. The resulting flour was readily dispersible in water.

*Example 5*

20 kilograms of formaldehyde urea resin was dispersed in a liquid system consisting of 2,000 cc. of water and 15 gallons of isopropanol. This was thoroughly agitated. The liquid system was removed and the solids were dried producing the improved form of formaldehyde urea resin which was free flowing, anti-caking and most easily dispersible in water.

*Example 6*

20 kilograms of formaldehyde urea resin was dispersed in a liquid system consisting of 2,000 cc. of water and 15 gallons of acetone. This was thoroughly agitated. The liquid system was removed and the solids were dried producing the improved form of formaldehyde urea resin which was free flowing, anti-caking and most easily dispersible in water.

*Example 7*

2,000 gms. of plaster was dispersed in a liquid system consisting of 200 cc. of water and 3,000 cc. of isopropanol. This was thoroughly agitated. The liquid system was removed and the solids were dried, producing the improved form of plaster which was free flowing, anti-caking and most easily dispersible in water.

*Example 8*

2,000 gms. of plaster was dispersed in a liquid system consisting of 200 cc. of water and 3,000 cc. of acetone. This was thoroughly agitated. The liquid system was removed and the solids were dried, producing the improved form of plaster which was free flowing, anti-caking and most easily dispersible in water.

*Example 9*

A system was prepared containing 250 gms. of cake mix containing 25% of insoluble dried powdered egg solids, 2,000 cc. of acetone and 50 cc. of water. The liquids were combined first, and the cake mix added with agitation. The liquid was removed and the powder was air dried with heat. The resulting flour was readily dispersible in water.

*Example 10*

A system was prepared containing 500 gms. of carbon black, 250 cc. of acetone, and 50 cc. of water. The liquids were combined first and the carbon black added. The liquid was poured off and the carbon black was air dried with heat. The resulting carbon black was readily dispersible in water.

*Example 11*

2,000 gms of bentonite was dispersed in a liquid system consisting of 200 cc. of water, and 3,000 cc. of isopropanol. This was thoroughly agitated. The liquid system was removed and the solids were dried, producing the improved form of bentonite which was free flowing, anti-caking and most easily dispersible in water.

*Example 12*

A system was prepared containing 500 gms. of powdered freshly ground titanium dioxide, 250 cc. of acetone, and 50 cc. of water. The liquids were combined first and the titanium dioxide added. The liquid was poured off and the titanium dioxide was air dried with heat. The resulting titanium dioxide was readily dispersible in water.

*Example 13*

A system was prepared containing 500 gms. of dried iron ore (hematite) powder, 250 cc. of acetone, and 50 cc. of water. The liquids were combined first and the hematite added. The liquid was poured off and the hermatite was air dried with heat. The resulting iron ore (hematite) was readily dispersible in water.

*Example 14*

A system was prepared containing 500 gms. of powdered freshly ground silica, 250 cc. of acetone, and 50 cc. of water. The liquids were combined first and the silica added. The liquid was poured off and the silica was air dried with heat. The resulting silica powder was readily dispersible in water.

*Example 15*

A system was prepared containing 500 gms. of powdered freshly ground zinc oxide, 250 cc. of acetone, and 50 cc. of water. The liquids were combined first and the zinc oxide added. The liquid was poured off and the zinc oxide was air dried with heat. The resulting zinc oxide was readily dispersible in water.

*Example 16*

A system was prepared containing 1,000 gms. of titanium dioxide dispersed in a solution consisting of 10 gms. of sodium carboxymethyl cellulose dissolved in 3,000 cc. of water. When the titanium dioxide was completely dispersed, the sodium carboxymethyl cellulose was insolubilized by the acidification of the sol with hydrochloric acid. The liquid was then drained off and the titanium dioxide was washed in fresh water and dried with or without heat. The resulting material was free flowing, dust free and was characterized by being more readily dispersible in aqueous and non-aqueous solvents, and displayed a greater covering power than untreated titanium dixoide.

*Example 17*

1000 gms. of ttanium dioxide were dispersed in a solution consisting of 10 gms. of sodium carboxymethyl cellulose in 3000 cc. of water. When the titanium dioxide was completed dispersed, the sodium carboxymethyl cellulose was insolubilized by adding alum solution. The liquid was then drained off of the titanium dioxide and the latter was washed in fresh water and dried with or without heat to form a free flowing, dust free liquid dispersible powder.

*Example 18*

1000 gms. of cellulose floc were dispersed in a solution consisting of 10 gms. of sodium carboxymethyl cellulose in 5000 cc. of water. When the floc was completely dispersed, the sodium carboxymethyl cellulose was insolubilized by acidification with hydrochloric acid. The liquid was then drained off and the floc washed with fresh water and dried with or without heat to give a floc which was free flowing and readily dispersible in liquids without dusting.

*Example 19*

1000 gms. of titanium dioxide were dispersed in a solution consisting of 10 gms. of methyl cellulose in 3000 cc. of water. When the titanium dioxide was completely dispersed, the methyl cellulose was insolubilized by heating the slurry. The liquid was then drained off the titanium dioxide, which was then dried with or without heat to form a free flowing, dust free liquid dispersible powder.

*Example 20*

1000 gms. of cellulose floc were dispersed in a solution consisting of 10 gms. of methyl cellulose in 5000 cc. water. When the floc was completely dispersed, the methyl cellulose was insolubilized by heating the slurry. The liquid was then drained off and the floc dried with or without heat to give a floc which was free flowing and readily dispersible in liquids without dusting.

I claim:
1. The method of converting solvent insoluble solid particles which normally tend to cake in storage and clump in a liquid dispersing medium to free-flowing dry particles instantly dispersible in liquids, comprising homogeneously wetting the surfaces of said solid particles with a liquid mixture consisting essentially of water and a volatile organic liquid miscible with the water, said solid particles being insoluble in either component of said liquid mixture, and then drying said wetted solids to remove all of the wetting liquid.
2. The method of claim 1 wherein the solid particles are insoluble dried proteinaceous solids.
3. The method of claim 1 wherein the solid particles are albumen.
4. The method of claim 1 wherein the solid particles are clay.
5. The method of claim 1 wherein the solid particles are cement.
6. The method of claim 1 wherein the solid particles are inorganic pigment.
7. The method of claim 1 wherein the solid particles are silica.
8. The method of converting a mixture of solid particles, some of which are solvent soluble and a large portion of which are solvent insoluble, said solids mixture normally tending to cake in storage and clump in a liquid dispersing medium, to free-flowing dry particles instantly dispersible in liquids, comprising homogeneously wetting the surfaces of said mixture of solid particles with a liquid mixture consisting essentially of water and a volatile organic liquid miscible with the water, the total solvent component of the liquid mixture with which said solids mixture is wet being less than sufficient to dissolve the solvent soluble component of said solids mixture, and then drying said wetted solids mixture to remove all of the wetting liquid.
9. The method of claim 8 wherein the solids mixture is a food mix comprising both soluble and insoluble solids components.
10. The method of coating solid particles comprising a substantial proportion of solvent insoluble components to form free-flowing non-caking coated particles instantly dispersible in liquids, comprising homogeneously wetting the surfaces of said particles with a liquid mixture consisting essentially of water and a volatile organic liquid miscible with water, said solid particles being insoluble in either component of said liquid mixture, said liquid mixture having dissolved therein a film-forming substance soluble therein, and then drying said wetted solids to remove all of the wetting liquid whereby upon drying the film-forming substance forms a dry coating upon the surfaces of said particles.
11. The method of claim 1 wherein the solid particles are dried whole eggs.

12. The method of claim 1 wherein the solid particles are dried egg yolks.

References Cited by the Examiner

UNITED STATES PATENTS

| | | | |
|---|---|---|---|
| 1,955,121 | 4/1934 | Folke et al. | 23—313 X |
| 2,221,175 | 11/1940 | Bechtold | 23—313 X |
| 2,356,282 | 8/1944 | Stamatoff | 260—90 |
| 2,394,244 | 2/1946 | Kokatnur | 23—91 |
| 2,970,063 | 1/1961 | Jordan et al. | 106—208 |
| 2,995,773 | 8/1961 | Gidlow et al. | 18—1 |
| 3,089,824 | 5/1963 | Wurster | 167—82 |

A. LOUIS MONACELL, *Primary Examiner.*

RAYMOND N. JONES, *Assistant Examiner.*